(12) United States Patent
Lee et al.

(10) Patent No.: US 12,172,231 B2
(45) Date of Patent: *Dec. 24, 2024

(54) BATTERY MODULE AND MANUFACTURING METHOD THEREOF

(71) Applicant: SK On Co., Ltd., Seoul (KR)

(72) Inventors: Tae Gu Lee, Daejeon (KR); Kenneth Kim, Daejeon (KR); Yun Joo Noh, Daejeon (KR)

(73) Assignee: SK ON CO., LTD., Seoul (KR)

( * ) Notice: Subject to any disclaimer, the term of this patent is extended or adjusted under 35 U.S.C. 154(b) by 58 days.

This patent is subject to a terminal disclaimer.

(21) Appl. No.: 18/197,735

(22) Filed: May 16, 2023

(65) Prior Publication Data

US 2023/0278138 A1 Sep. 7, 2023

Related U.S. Application Data

(63) Continuation of application No. 16/294,354, filed on Mar. 6, 2019, now Pat. No. 11,691,220.

(30) Foreign Application Priority Data

Mar. 6, 2018 (KR) .......................... 10-2018-0026475

(51) Int. Cl.
*B23K 26/21* (2014.01)
*H01M 10/058* (2010.01)
(Continued)

(52) U.S. Cl.
CPC ........... *B23K 26/21* (2015.10); *H01M 10/058* (2013.01); *H01M 50/211* (2021.01);
(Continued)

(58) Field of Classification Search
CPC .... H01M 50/531; H01M 50/20; H01M 50/50; H01M 50/502; H01M 50/543; H01M 10/058; H01M 2220/20; H01M 10/0525; H01M 50/528; H01M 50/172; H01M 10/052; H01M 50/572; H01M 50/147; H01M 50/538; H01M 50/10; H01M 10/0587; H01M 10/0431; H01M 10/425; H01M 50/103; H01M 10/613; H01M 50/183; H01M 50/116; H01M 10/482; H01M 10/625; H01M 50/54; H01M 50/166; H01M 10/0413; H01M 50/578; H01M 50/3425; H01M 10/04; H01M 2200/103;
(Continued)

(56) References Cited

U.S. PATENT DOCUMENTS

2018/0159111 A1* 6/2018 Wang .................. H01M 50/176

FOREIGN PATENT DOCUMENTS

JP 2007109548 * 4/2007 .............. H01M 2/10

* cited by examiner

*Primary Examiner* — Kaity V Chandler
(74) *Attorney, Agent, or Firm* — IP & T GROUP LLP

(57) ABSTRACT

The present invention provides a battery module, which includes: a plurality of battery cells which include electrode tabs, respectively; and one or more bus bars connected to the electrode tabs for electrically connecting the plurality of battery cells with each other, wherein each of the one or more bus bars includes a plate having one or more openings formed therein, and a plurality of adjacent electrode tabs among the electrode tabs are inserted into any one of the one or more openings of the plate to be electrically connected with each other.

19 Claims, 12 Drawing Sheets

(51) Int. Cl.
*H01M 50/211* (2021.01)
*H01M 50/50* (2021.01)
*H01M 50/505* (2021.01)
*H01M 50/512* (2021.01)
*H01M 50/516* (2021.01)
*H01M 50/553* (2021.01)

(52) U.S. Cl.
CPC .......... *H01M 50/50* (2021.01); *H01M 50/505* (2021.01); *H01M 50/512* (2021.01); *H01M 50/516* (2021.01); *H01M 50/553* (2021.01)

(58) Field of Classification Search
CPC ............. H01M 50/15; H01M 2200/20; H01M 50/209; H01M 4/525; H01M 50/581; H01M 10/486; H01M 4/661; H01M 50/171; H01M 10/647; H01M 50/107; H01M 50/529; H01M 50/30; H01M 10/6551; H01M 10/4257; H01M 50/169; H01M 4/505; H01M 2200/00; H01M 50/152; H01M 10/0567; H01M 2010/4271; H01M 4/131; H01M 2004/021; H01M 50/60; H01M 10/0436; H01M 10/0585; H01M 10/48; H01M 4/485; H01M 10/0569; H01M 2220/30; H01M 4/13; H01M 50/155; H01M 10/42; H01M 10/6554; H01M 10/0422; H01M 2004/028; H01M 10/4235; H01M 10/643; H01M 50/35; H01M 50/56; H01M 10/6555; H01M 4/133; H01M 50/545; H01M 2004/027; H01M 4/70; H01M 50/24; H01M 2200/106; H01M 50/213; H01M 50/571; H01M 4/587; H01M 50/148; H01M 50/463; H01M 10/6553; H01M 50/308; H01M 10/653; H01M 4/364; H01M 10/345; H01M 2010/4278; H01M 50/597; H01M 2300/0025; H01M 50/557; H01M 4/134; H01M 10/05; H01M 4/0404; H01M 4/386; B23K 26/21; B23K 2101/38
See application file for complete search history.

BATTERY MODULE AND MANUFACTURING METHOD THEREOF

CROSS-REFERENCE TO RELATED APPLICATION

This present application is a Continuation of U.S. application Ser. No. 16/294,354 filed on Mar. 6, 2019, which claims priority to Korean Patent Applications No. 10-2018-0026475 filed on Mar. 6, 2018 in the Korean Intellectual Property Office (KIPO), the entire disclosure of which are incorporated by reference herein.

BACKGROUND OF THE INVENTION

1. Field of the Invention

The present invention relates to a battery module and a manufacturing method thereof.

2. Description of the Related Art

Research into a rechargeable secondary battery capable of being charged and discharged has been actively conducted in accordance with the development of state-of-the-art fields such as a digital camera, a cellular phone, a laptop computer, a hybrid automobile and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile by connecting a plurality of lithium secondary batteries are connected in series with each other to thereby be used for a high output hybrid automobile. Since the lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has been rapidly increased.

Meanwhile, in a conventional battery module, a bus bar is adhered to electrode tabs to connect a plurality of battery cells between the above-described module type secondary battery manufacturing processes. Conventionally, a U-shaped bus bar is used. The electrode tabs come into contact with the U-shaped bus bar, such that two or more battery cells may be electrically connected with each other.

However, in the conventional battery module, it is necessary to connect two electrode tabs by one bus bar at a time. Therefore, it takes a relatively long amount of time to connect the plurality of battery cells with each other, and the contact between the bus bar and the electrode tabs becomes unstably, or it is difficult to clearly identify the welded portion during a welding process.

For example, Korean Patent Laid-Open Publication No. 10-2015-0110078 (published on Oct. 2, 2015) discloses a bus bar for connecting cell tabs of a battery module including battery cells arranged in a stacked form, however, it did not solve the above-described problems.

SUMMARY OF THE INVENTION

It is an object of embodiments of the present invention to provide a battery module and a manufacturing method thereof which may visually confirm a connection state when electrically connecting a plurality of battery cells with each other by welding or the like.

In addition, another object of embodiments of the present invention is to provide a battery module and a manufacturing method thereof, which may be easily manufactured by vertically irradiating a bus bar with a laser beam when performing laser welding or the like.

Further, another object of embodiments of the present invention is to provide a battery module and a manufacturing method thereof, which can prevent a battery cell from being directly irradiated with a laser beam, thereby minimizing a safety problem which may occur between manufacturing processes.

Further, another object of embodiments of the present invention is to provide a battery module and a manufacturing method thereof, which is capable of uniformly melting electrode tabs when electrically connecting a plurality of battery cells.

Further, another object of embodiments of the present invention is to provide a battery module and a manufacturing method thereof, which is capable of easily welding three or more electrode tabs at the same time.

Furthermore, another object of embodiments of the present invention is to provide a manufacturing method of a battery module, which may connect a plurality of battery cells by a single welding process, thereby improving a production speed in manufacturing processes.

To achieve the above-described objects, according to an aspect of the present invention, there is provided a battery module including: a plurality of battery cells which include electrode tabs, respectively; and one or more bus bars connected to the electrode tabs for electrically connecting the plurality of battery cells with each other, wherein each of the one or more bus bars includes a plate having one or more openings formed therein, and a plurality of adjacent electrode tabs among the electrode tabs are inserted into any one of the one or more openings of the plate to be electrically connected with each other.

At least a part of the one or more bus bars may include at least two openings.

The opening may be formed in a slit shape.

Each of electrode tab groups including the plurality of adjacent electrode tabs among the electrode tabs may be inserted into each of the one or more openings corresponding thereto.

Each of the electrode tabs may include: a first bent part formed by bending at least a part thereof in each of the electrode tabs in one direction; and a second bent part formed by bending at least a part of the remaining section thereof in each of the electrode tabs in a direction different from the one direction.

Each of the first bent part and the second bent part may be bent at an angle of 80 to 90 degrees.

Each of the electrode tabs may include a seat portion between the first bent part and the second bent part, and the bus bar may be placed on the seat portion.

Each of the electrode tabs may include an insulation portion formed in at least a part of the electrode tab, and the first bent part may be formed in a section of the insulation portion.

The plurality of adjacent electrode tabs may be connected in parallel to any one of the one or more bus bars.

According to another aspect of the present invention, there is provided a method of manufacturing a battery module, including: stacking a plurality of battery cells which include electrode tabs, respectively; bring a plurality of adjacent electrode tabs among the electrode tabs into contact with each other; inserting the plurality of adjacent electrode tabs into any one of one or more openings formed in a plate from one side thereof, so as to be disposed in any one of one or more openings; and electrically connecting the plurality of adjacent electrode tabs with each other.

Each of electrode tab groups including the plurality of adjacent electrode tabs among the electrode tabs may be inserted into each of the one or more openings corresponding thereto.

Each of the electrode tabs may be prepared by including: bending at least a part thereof in each of the electrode tabs in one direction; and bending at least a part of the remaining section thereof in each of the electrode tabs in a direction different from the one direction.

In the bending steps, each of the bent parts may be bent at an angle of 80 to 90 degrees.

In the electrically connecting step, the plurality of adjacent electrode tabs may be connected with each other in a state in which the plate is placed on at least a part of the plurality of adjacent electrode tabs.

The plate and the plurality of adjacent electrode tabs may be connected with each other by laser welding.

A laser beam may be repeatedly irradiated in a circular pattern, and centers of circles foiled by the laser beam may be arranged along a longitudinal axis of the end faces of the plurality of adjacent electrode tabs.

The laser beam may be irradiated in a direction perpendicular to the plate.

The laser welding may be performed in a state in which a jig is inserted between the plurality of adjacent battery cells including the plurality of adjacent electrode tabs and the plate.

According to the embodiments of the present invention, the connection state may be visually confirmed when electrically connecting the plurality of battery cells with each other by welding or the like.

Further, according to the embodiments of the present invention, the battery module may be easily manufactured by vertically irradiating the bus bar with a laser beam when performing laser welding or the like.

In addition, according to the embodiments of the present invention, it is possible to prevent the battery cell from being directly irradiated with a laser beam, thereby minimizing a safety problem which may occur between manufacturing processes.

In addition, according to the embodiments of the present invention, the electrode tabs may be uniformly melted when electrically connecting the plurality of battery cells with each other.

Further, according to the embodiments of the present invention, three or more electrode tabs may be easily welded at the same time.

Furthermore, according to the embodiments of the present invention, since the plurality of battery cells may be connected by a single welding process, a production speed in manufacturing processes may be improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
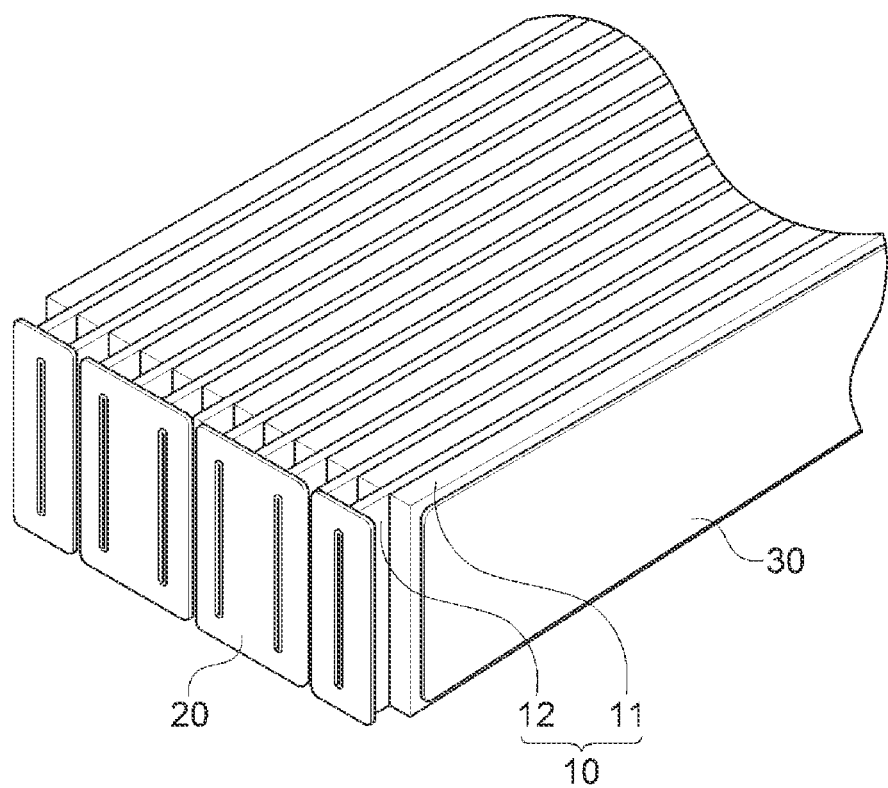
FIG. 1 is a perspective view of a battery module according to an embodiment of the present invention.

Hereinafter, specific embodiments of the present invention will be described with reference to the accompanying drawings. However, these are merely illustrative examples and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and can be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

Meanwhile, in the present disclosure, a configuration, in which a plurality of battery cells 10 are arranged side by side and a bus bar 20 is placed on an upper side of the plurality of battery cells 10, will be described, but it is not limited thereto, and it will be obviously appreciated to those skilled in the art that the plurality of battery cells may be stacked in a direction perpendicular to a paper surface and the bus bar 20 may be horizontally attached from a side of the plurality of battery cells 10.

FIG. 1 is a perspective view of a battery module 1 according to an embodiment of the present invention.

Referring to FIG. 1, the battery module 1 according to the embodiment of the present invention may include the plurality of battery cells 10 stacked in a group and one or more bus bars 20 for electrically connecting the plurality of battery cells 10 with each other.

Specifically, each of the above-described plurality of battery cells 10 includes a cell body 11 which is configured to house an electrode assembly (not illustrated) therein and is packed in a pouch-shaped sheath (not illustrated) including a resin layer and a metal layer, and electrode tabs 12 drawn from the electrode tab 11. In addition, each of the above-described one or more bus bars 20 may include a plate 21 having one or more openings 23 formed therein, and a plurality of adjacent electrode tabs 12 among the plurality of electrode tabs 12 may be inserted into any one of the one or more openings 23 formed in the plate 21 to be electrically connected with each other.

Figure 2A:
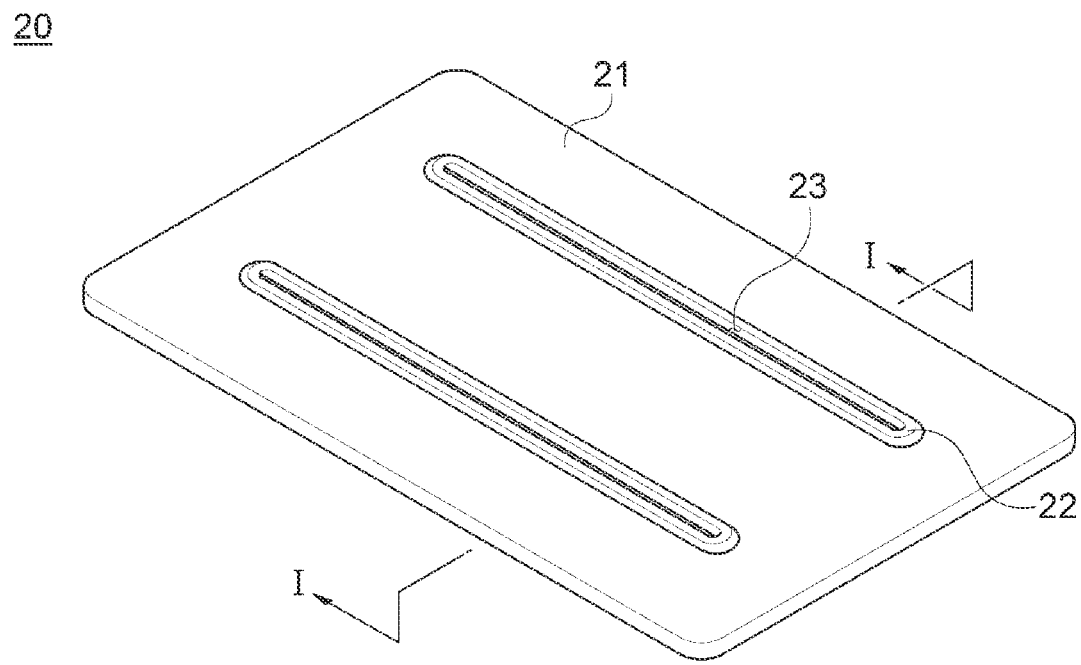
FIG. 2A is a perspective view illustrating a bus bar according to the embodiment of the present invention.
Figure 2B:
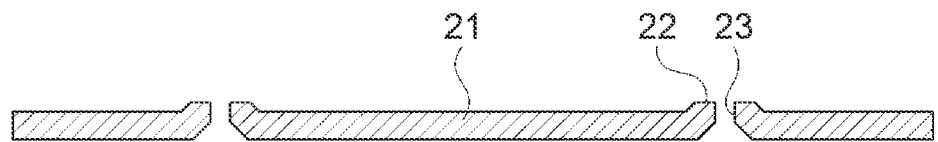
FIG. 2B is a cross-sectional view taken on line I-I for illustrating the bus bar shown in FIG. 2A.

FIG. 2A is a perspective view illustrating the bus bar according to the embodiment of the present invention, and FIG. 2B is a cross-sectional view taken on line I-I for illustrating the bus bar 20 shown in FIG. 2A Referring to FIGS. 2A and 2B, the bus bar 20 according to the embodiment of the present invention may include protrusions 22. The protrusions 22 may be formed on the plate 21 at positions where the openings 23 are formed. By forming the protrusions 22, it is possible to induce an electrode tab group (illustrated in FIG. 3) to be inserted into the opening 23, which will be described below.

Further, the plate 21 is configured in such a way that a width of a space, in which the electrode tab group 13 is introduced from one side (a lower side in FIG. 2) of the plate 21, is decreased toward the opening 23.

Specifically, the bus bar 20 according to the embodiment of the present invention may include one or more openings 23 formed by penetrating at least a part of the plate 21 in a thickness direction. At this time, the opening 23 may be longitudinally formed in a slit shape.

Accordingly, when the electrode tab 12 is drawn in a thin plate shape from one side of the cell body 11, the adjacent electrode tabs 12 may be easily inserted into the slit-shaped opening 23 with being in contact with each other. The plurality of electrode tabs 12 inserted into the opening 23 and the bus bar 20 may be electrically connected with each other in a subsequent bonding process such as welding.

Further, the above-described one or more bus bars 20 may include at least two openings 23 formed in a portion thereof. Thereby, at least four battery cells 10 may be electrically connected with each other through the two opening 23 of one bus bar 20. The electrical connection relationship between the bus bar 20 and the plurality of battery cells 10 will be described below.

Meanwhile, the at least two openings 23 may be formed in the plate 21 with a predetermined interval. The predetermined interval may be determined based on the number of the battery cells 10 to be connected. That is, when electrically connecting four battery cells 10 by one bus bar 20, the interval between two openings 23 formed in the plate 21 may be determined based on a total thickness of the four battery cells 10 with being stacked in a group. It will be obviously appreciated to those skilled in the art that the distance between the openings 23 may vary based on the width of one battery cell 10.

Figure 3:
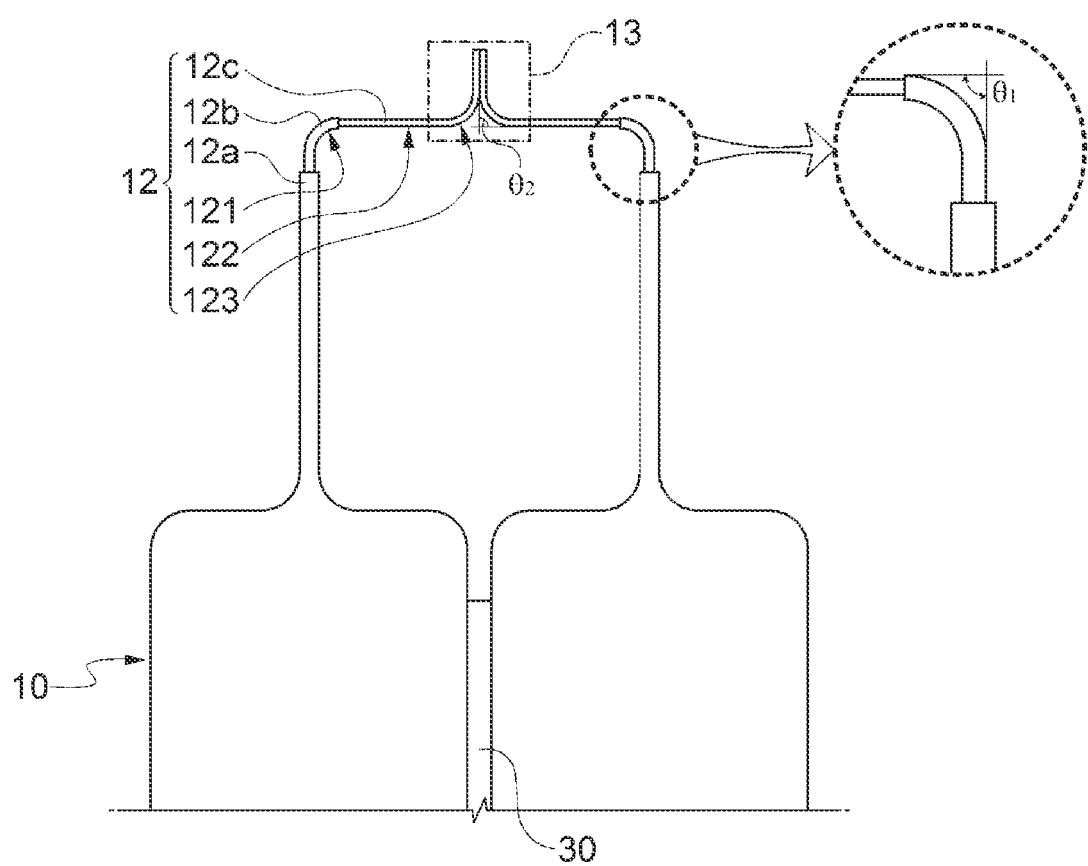
FIG. 3 is a schematic view illustrating a plurality of adjacent battery cells among a plurality of battery cells according to the embodiment of the present invention.

FIG. 3 is a schematic view illustrating a plurality of adjacent battery cells 10 among the plurality of battery cells 10 according to the embodiment of the present invention.

Referring to FIG. 3, the battery cell 10 according to the embodiment of the present invention may include the cell body 11 and the electrode tab 12 drawn from the cell body 11. At this time. The electrode tab 12 may include a terrace portion 12a formed by bonding the sheath along a side edge from which the electrode tab 12 is extended in the electrode assembly, an insulation portion 12b continued from the terrace portion 12a to increase sealing properties of the sheath and secure an electrical insulation state, is extended at a position where the electrode tab 12 is drawn from the terrace portion 12a, and an electrode tab portion 12c whose one end is continued from the insulation portion 12b and at least a part of the other end portion is inserted into the opening 23.

In addition, in order to insert and position the plurality of adjacent electrode tabs 12 into one opening 23 according to the embodiment of the present invention, the above-described electrode tabs 12 may include a first bent part 121 formed by bending at least a part thereof in each of the electrode tabs 12 in one direction, and a second bent part 123 formed by bending at least a part of the remaining section thereof in each of the electrode tabs 12 in a direction different from the one direction. That is, the first bent part 121 and the second bent part 123 may be formed by bending in opposite directions to each other. In other words, when bending the first bent part 121 in a clockwise direction, the second bent part 123 may be formed by bending in a counterclockwise direction, and when bending the first bent part 121 in the counterclockwise direction, the second bent part 123 may be formed by bending in the clockwise.

Specifically, the plurality of adjacent electrode tabs 12 drawn from the adjacent battery cells 10 among the plurality of battery cells 10 are positioned while at least a part of end portions thereof coming into contact with each other, so as to form the electrode tab group 13. At this time, in order for at least a part of each of the plurality of electrode tabs 12 to come into contact with each other, each of the electrode tabs 12 may include the first bent part 121 and the second bent part 123. The directions in which the first bent part 121 and the second bent part 123 are formed in the plurality of adjacent electrode tabs 12 are different from each other. Thus, a pair of the adjacent electrode tabs 12 may come into contact with each other while facing each other.

Meanwhile, the first bent part 121 may be formed by bending the electrode tab portion 12c continued from the insulation portion 12b, but it is not limited thereto, and the first bent part 121 may be formed in a section of the insulation portion 12b by bending the insulation portion 12b of the electrode tab 12. As described above, since the bent part is formed in the insulation portion 12b, a volume occupied by the electrode tab 12 in the battery module 1 may be minimized.

In addition, when forming the bent part in the section of the insulation portion 12b of the electrode tab 12, bending thereof may be performed within a range in which the insulation portion 12b is not torn or damaged. Therefore, the volume occupied by the electrode tabs 12 in the battery module 1 may be reduced while maintaining an insulation performance of the insulation portion 12b. Thereby, as a total volume of the battery module 1 is reduced, an energy density of the battery module 1 may be increased.

Meanwhile, each of the first bent part 121 and the second bent part 123 may be bent at angles θ1 and θ2 similar to each other, and preferably, may be bent at angles θ1 and θ2 of 80 to 90 degrees. Specifically, the first bent part 121 and the second bent part 123 may be bent in opposite directions to each other. As the first bent part 121 and the second bent part 123 are bent in radiuses similar to each other, the end portions of the electrode tabs 12 inserted into the opening 23 may be positioned at a substantially right angle with respect to the plate 21, and the plurality of adjacent electrode tabs 12 may be easily inserted into the opening 23 of the bus bar 20. In addition, since the first bent part 121 and the second bent part 123 are formed at angles θ1 and θ2 of 80 to 90, a jig 40 may be easily inserted during a laser welding process to be described below. In this regard, the laser welding process will be described in detail below with reference to FIG. 9.

Figure 4:
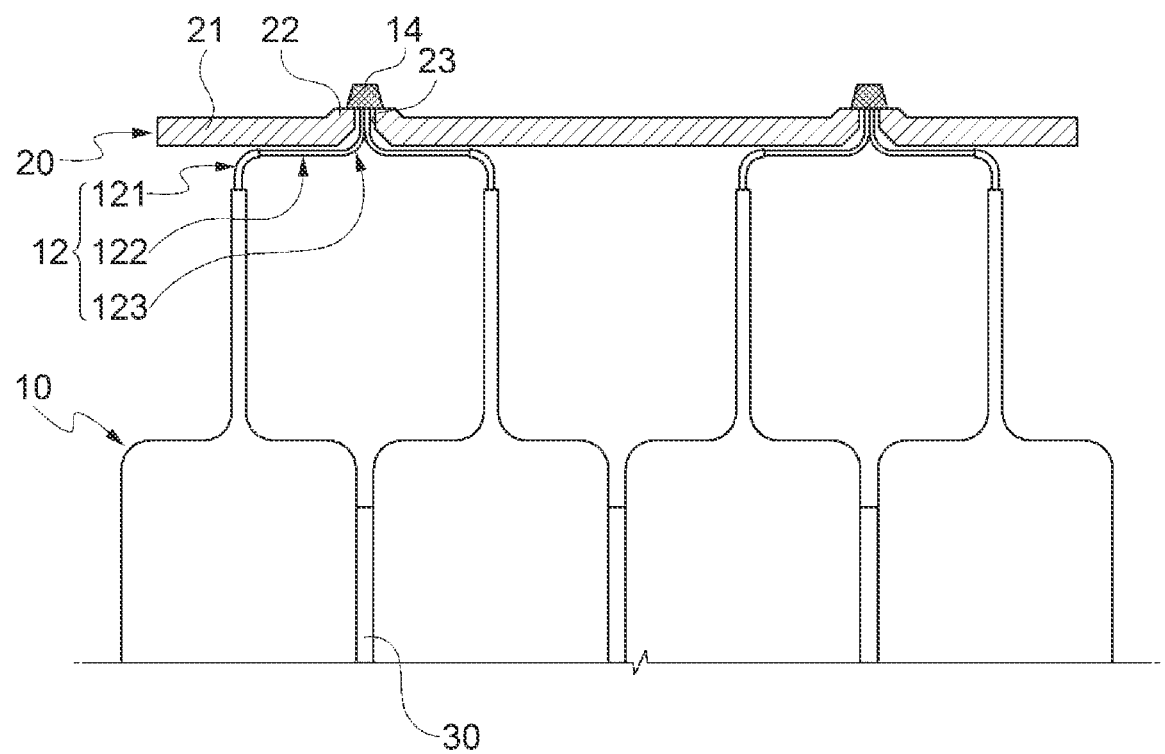
FIG. 4 is a cross-sectional view illustrating a state in which two electrode tabs are inserted into and fixed to an opening of the bus bar according to the embodiment of the present invention.
Figure 5:
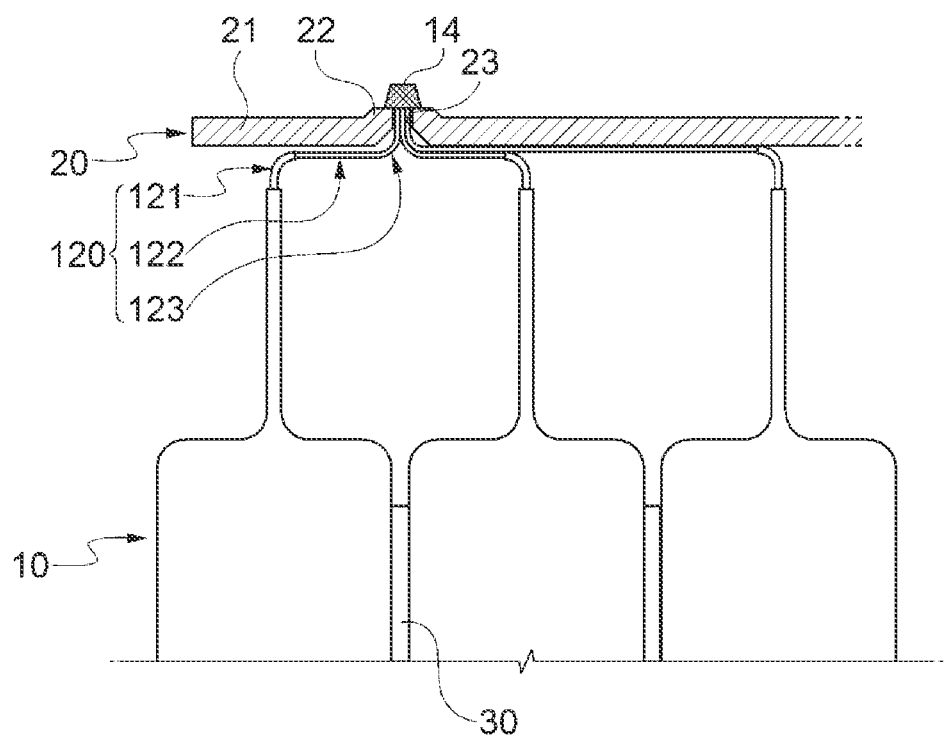
FIG. 5 is a cross-sectional view illustrating a state in which three electrode tabs are inserted into and fixed to an opening of the bus bar according to the embodiment of the present invention.

FIG. 4 is a cross-sectional view illustrating a state in which two electrode tabs 12 are inserted into and fixed to the opening 23 of the bus bar 20 according to the embodiment of the present invention, and FIG. 5 is a cross-sectional view illustrating a state in which three electrode tabs 12 are inserted into and fixed to the opening 23 of the bus bar 20 according to the embodiment of the present invention.

Referring to FIGS. 4 and 5, a plurality of adjacent electrode tabs 12 among the plurality of electrode tabs 12 may be inserted into any one of one or more openings 23 formed in the bus bar 20. At this time, each of electrode tab groups 13 including the plurality of adjacent electrode tabs 12 among the plurality of electrode tabs 12 may be positioned with being inserted into one or more openings 23 formed in the bus bar 20 respectively corresponding thereto.

Specifically, an electrode tab group 13 including two electrode tabs 12, which are positioned adjacent to each other among four electrode tabs 12 located at one side of the battery cell 10 while at least a part of the end portions thereof coming into contact with each other by the first bent part 121 and the second bent part 123, may be positioned with being inserted into any one of one or more openings 23 of the bus bar 20. As illustrated in FIG. 4, two electrode tab groups 13 may be positioned with being inserted into the openings 23 of the bus bar 20 respectively corresponding thereto.

In addition, as illustrated in FIG. 5, three adjacent electrode tabs 12 of the plurality of battery cells 10 are positioned with being inserted into any one of one or more openings 23 of the bus bar 20 while at least a part of each of the electrode tabs 12 coming into contact with each other. That is, since three battery cells 10 may be electrically connected with each other by a single bonding process, a production speed in manufacturing processes of the battery module 1 may be greatly increased.

However, the battery module 1 according to the embodiment of the present invention is not limited thereto, and any configuration may be used so long as the plurality of electrode tabs 12 adjacent to each other can be inserted into and fixed to one opening 23 of the bus bar 20, for example, the electrode tabs 12 of four battery cells 10 are inserted into and bonded to one opening 23 of the bus bar 20.

Further, each of the electrode tabs 12 may include a seat portion 122 between the first bent part 121 and the second bent part 123, and the bus bar 20 may be supported with being placed on the seat portion 122. Specifically, the seat portion 122 between the first bent part 121 and the second bent part 123 may be positioned in parallel to the plate 21 of the bus bar 20, and the bus bar 20 is placed on the seat portion 122 included in the electrode tab 12, thus to come into plane contact with at least a part of the electrode tab 12. Thereby, the bus bar 20 is supported by the electrode tab 12 while coming into plane contact with the seat portion 122 thereof. Therefore, even if an external impact or the like is applied thereto, the connection structure between the bus bar and the electrode tab 12 is rarely damaged, such that durability of the battery module 1 may be increased.

Meanwhile, elastic members 30 may be installed between the plurality of battery cells 10. The above-described elastic member 30 may buffer swelling of the battery cell 10 due to thermal expansion, and may prevent the external impact and vibration from being transmitted to the battery cell 10. However, the elastic member 30 is not limited to the configuration of being disposed between the battery cells 10, but may be disposed between two bundles of the battery cells 10, or between three bundles of the battery cells 10, for example, by selecting the number of the battery cells 10, as necessary.

Meanwhile, the battery cells 10 may be connected with each other in various ways, for example, all four electrode tabs 12 are positioned with electrodes having the same polarity as each other, such that four battery cells 10 may be connected in parallel to each other, or otherwise, two electrode tabs 12 in one electrode tab group 13 may be positioned with electrodes having the same polarity as each other to be connected in parallel to each other, and two electrode tab groups 13 including the two electrode tabs 12 may be positioned with electrodes having different polarities from each other to be connected in series.

That is, in the battery module 1 according to the embodiment of the present invention, a plurality of openings 23 may be formed in one bus bar 20, and a plurality of battery cells 10 connected to the bus bar 20 may be connected in various ways such as a parallel or series connection. Therefore, the plurality of battery cells 10 may be electrically connected with each other in various ways by a user as necessary, without changing the shape of the bus bar 20.

Meanwhile, beads 14 may be formed at the end portions of the plurality of adjacent electrode tabs 12 inserted into the opening 23 of the bus bar 20 according to the embodiment of the present invention during a bonding process such as welding. Thereby, the electrode tab group 13 and the bus bar are connected with each other, and the plurality of battery cells 10 may be electrically connected with each other through the beads 14.

Figure 6A:
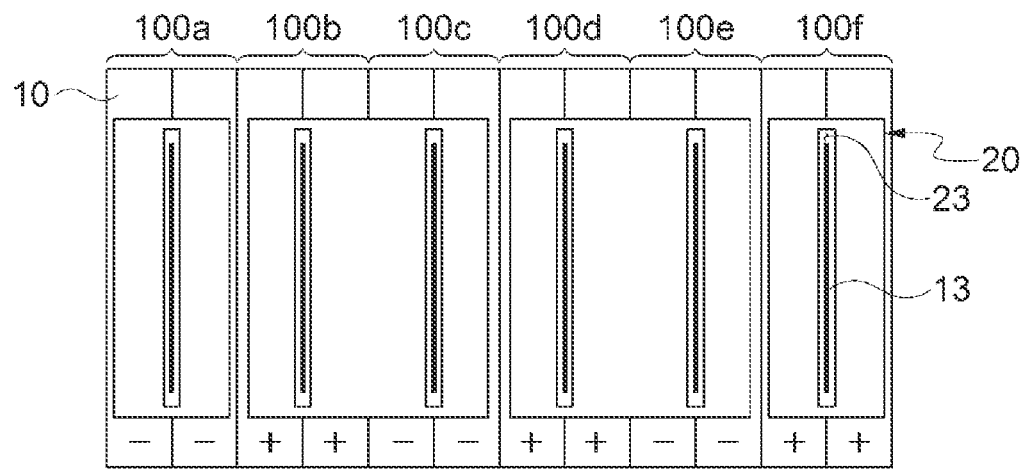
FIG. 6A is a front view illustrating an electrical connection state of the battery module according to the embodiment of the present invention.
Figure 6B:
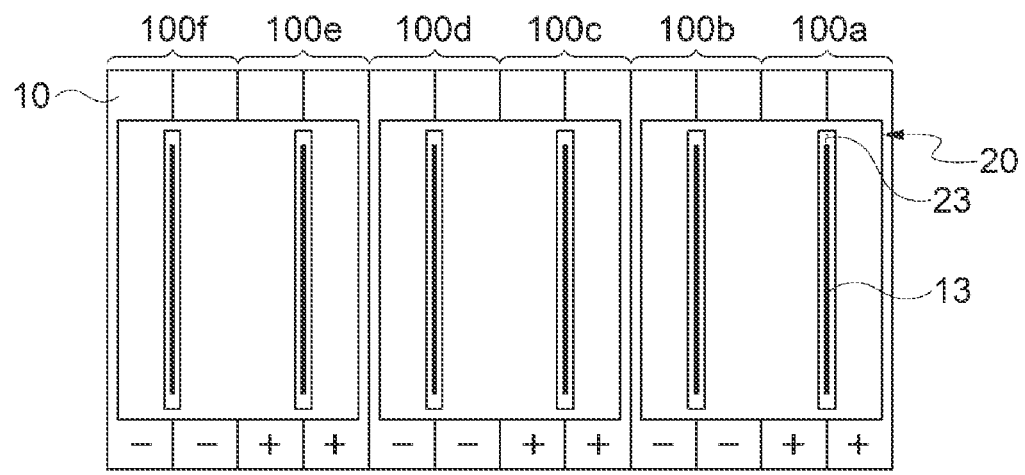
FIG. 6B is a rear view illustrating the electrical connection state of the battery module according to the embodiment of the present invention.

FIG. 6A is a front view illustrating an electrical connection state of the battery module 1 according to the embodiment of the present invention, and FIG. 6B is a rear view illustrating the electrical connection state of the battery module 1 according to the embodiment of the present invention (that is, the battery cell 10 at a left end of FIG. 6A corresponds to the battery cell 10 at a right end of FIG. 6B).

Referring to FIGS. 6A and 6B, two or more battery cells may be connected in parallel to each other through the bus bar 20 to form one parallel assembly. Then, the battery module 1 may be formed by providing a plurality of parallel assemblies and connecting in series with each other.

Specifically, as illustrated in FIG. 6A, when viewed from the front, two negative (−) poles of the two leftmost battery cells are connected in parallel by the bus bar 20 to form one parallel assembly 100a. Then, the above-described parallel assembly 100a may be arranged side by side and connected in series with an adjacent parallel assembly 100b having two positive (+) poles connected in parallel therein.

Specifically, six parallel assemblies 100*a*, 100*b*, 100*c*, 100*d*, 100*e*, and 100*f* having electrodes of different polarities from each other based on one direction of the plurality of battery cells 10 may be provided and connected in series with each other by the plurality of bus bars 20. That is, a total of 12 battery cells 10 may be electrically connected with each other. However, this configuration is illustrated as an example, and it is not limited thereto. For example, three battery cells 10 may be connected in parallel with electrodes having the same polarity as each other to form one parallel assembly (not illustrated), and a plurality of parallel assemblies may be provided and connected in series with each other.

As described above, in the battery modules 1 and 1 according to the embodiment of the present invention, the number of the battery cells 10 to be connected to one bus bar 20 may freely selected, and the number of the battery cells connected parallel and the number of the battery cells connected in series by the bus bar 20 among the plurality of battery cells 10 may be freely selected. Therefore, a degree of freedom in the configuration of the battery module 11 may be improved.

Figure 7:
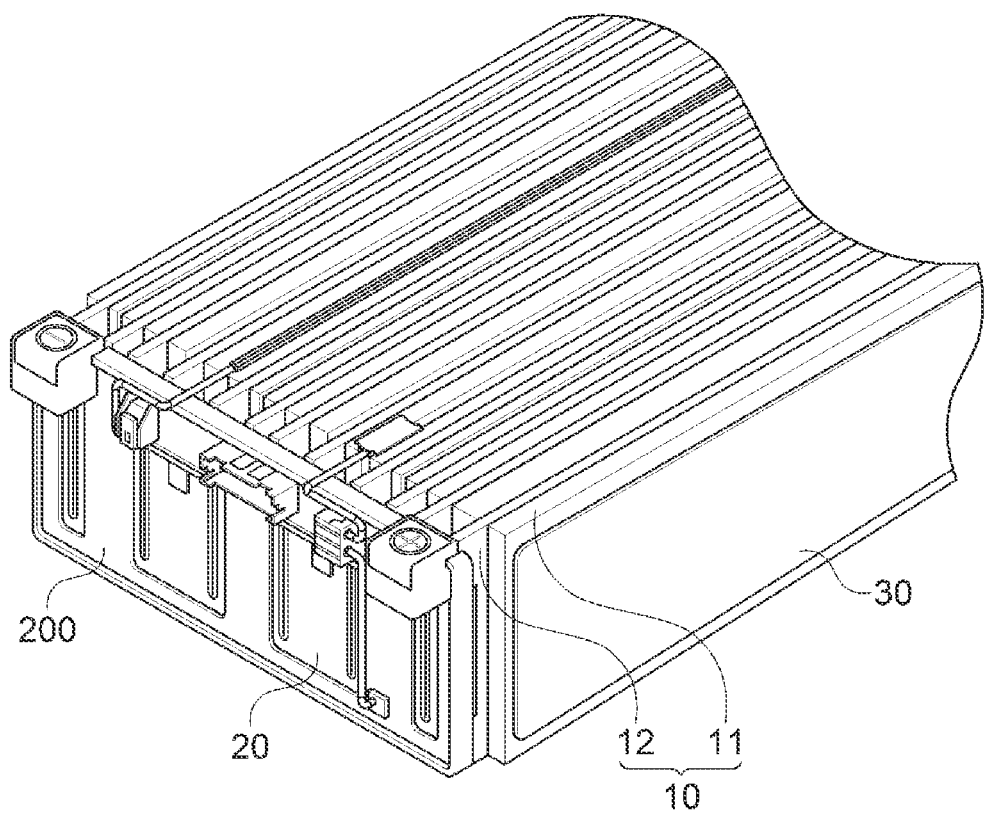
FIG. 7 is a perspective view illustrating one side of the battery module according to the embodiment of the present invention.

FIG. 7 is a perspective view illustrating one side of the battery module 1 according to the embodiment of the present invention;

Referring to FIG. 7, the battery module 1 according to the embodiment of the present invention may further include a bus bar cover 200 located outside the one or more bus bars 20 and configured to surround the bus bars 20.

Specifically, the bus bar cover 200 may be located in a shape to cover the outside of at least one bus bar 20, such that the bus bar 20 may be protected from external foreign matters and the like. In addition, the bus bar cover 200 may be made of an insulation material, thereby minimizing the possibility of electrical communication with an external object of the bus bar 20 connected to the plurality of battery cells 10.

Meanwhile, the bus bar cover 200 may be coupled with the plurality of bus bars 20, thereby it is possible to fix and support a position between the bus bars 20 in place.

At this time, the bus bar cover 200 and the plurality of bus bars 20 may be connected with each other by a fusion method such as welding or the like, but it is not limited thereto. Any configuration may be used so long as the bus bar cover 200 and the plurality of bus bars 20 can be coupled to each other, for example, a rear surface of the bus bar cover 200 is formed corresponding to the shape of the plurality of bus bars 20, and locking parts (not illustrated) having a predetermined elasticity are formed on at least a part thereof, such that the plurality of bus bars 20 are fastened to the bus bar cover 200 through the locking parts.

Figure 8A:
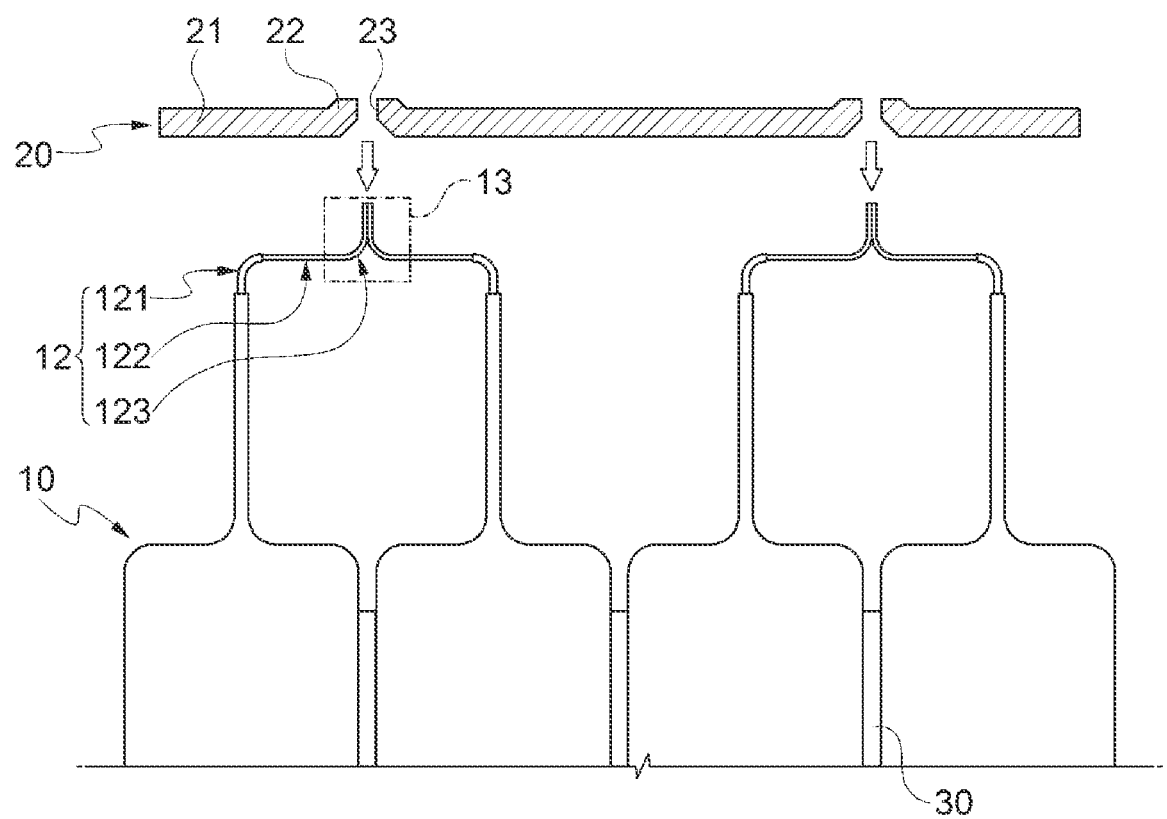
FIG. 8A is a cross-sectional view illustrating a state in which a bus bar comes in contact with a plurality of stacked battery cells according to another embodiment of the present invention.
Figure 8B:
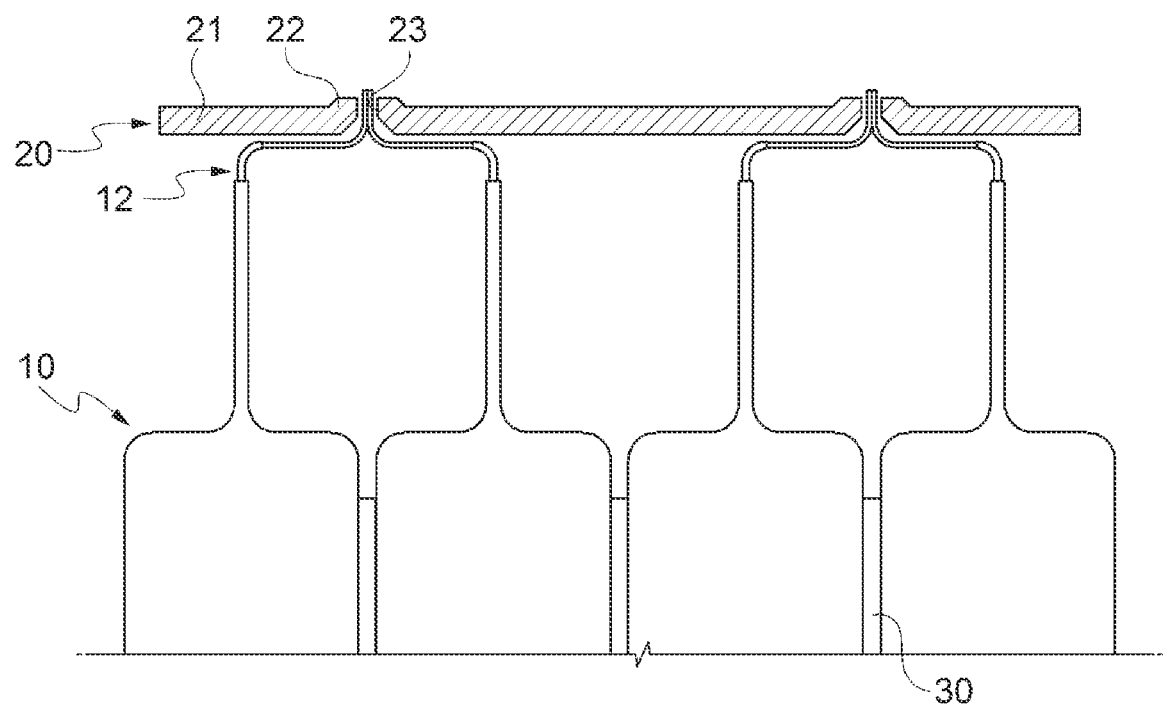
FIG. 8B is a cross-sectional view illustrating a state in which the bus bar is placed on the plurality of electrode tabs according to another embodiment of the present invention.

FIG. 8A is a cross-sectional view illustrating a state in which a bus bar 20 comes in contact with a plurality of stacked battery cells 10 according to another embodiment of the present invention, and FIG. 8B is a cross-sectional view illustrating a state in which the bus bar 20 is placed on the plurality of electrode tabs 12 according to another embodiment of the present invention.

Referring to FIGS. 8A and 8B, according to another embodiment of the present invention, a plurality of battery cells 10 are stacked, and a plurality of electrode tabs 12 of the adjacent battery cells 10 among the plurality of battery cells 10 come into contact with each other, then the plurality of adjacent electrode tabs 12 may be inserted into any one of one or more openings 23 on one side of the plate 21 in which one or more openings 23 are formed.

Specifically, a plurality of battery cells 10 which include the electrode tabs 12 respectively may be stacked. At this time, a plurality of adjacent electrode tabs 12 among the plurality of electrode tabs 12 come into contact with each other to form an electrode tab group 13.

More specifically, at least a part of the electrode tab 12 in each of the plurality of electrode tabs 12 may be bent in one direction, and at least a part of the remaining section of the electrode tab 12 may be bent in the direction different from the one direction. Thereby, a first bent part 121 and a second bent part 123 may be formed. By forming the first bent part 121 and the second bent part 123 of the plurality of adjacent electrode tabs 12 in opposite directions to each other, each of the plurality of adjacent electrode tabs 12 may be formed in a shape of facing each other while at least a part thereof coming into contact with each other. At this time, each of the electrode tabs 12 may be bent at an angle of 80 to 90 degrees. Thereby, the bus bar 20 may be easily placed on the electrode tabs 12, and the jig 40 may be easily inserted before the bonding process such as welding.

Thereafter, one or more bus bars 20 including the plate 21 having one or more openings 23 formed therein may be moved to the plurality of stacked battery cells 10 side, and then may be placed on the plurality of electrode tabs, as illustrated in FIG. 8B. At this time, each of the electrode tab groups 13 including a plurality of adjacent electrode tabs 12 among the electrode tabs 12 may be inserted into each of one or more openings 23 of the bus bar 20 respectively corresponding thereto.

Meanwhile, at least a part of the electrode tab groups 13 in a state in which the plurality of adjacent electrode tabs 12 are in contact with each other may be disposed so as to protrude outward from the bus bar 20. Thereby, a worker may visually confirm the welding position and easily check the welded portion 132 during the subsequent bonding process such as welding or the like.

Further, as described above, since the bus bar 20 may be placed and positioned on the seat portion 122 between the first bent part 121 and the second bent part 123 of the electrode tab 12, the position thereof can be supported between the welding processes, and a working error, which may be caused by a variation of the position of the bus bar 20 between the bonding processes such as welding, can be minimized.

Further, when manufacturing the battery module 1 according to another embodiment of the present invention, the electrode tab 12 is bent and positioned. Therefore, a distance between the end portion of the electrode tab 12 at which welding is performed and a portion from which the electrode tab 12 is drawn in the battery cell 10 may be increased, as compared to a case in which the electrode tab 12 is simply positioned perpendicular to the bus bar 20 without being bent. Thereby, a damage to the temperature-sensitive battery cell 10 may be prevented during the bonding process such as welding or the like.

When bonding the bus bar 20 and the electrode tab 12 with each other by laser welding or the like, a laser beam (illustrated in FIG. 9B) is directly irradiated into a gap between the electrode tabs 12 and the protrusion 22 of the bus bar 20, thereby it is possible to prevent the laser beam from reaching the cell body 11, and minimize restrictions such as irradiating a laser beam L at an inclined angle with respect to a direction in which the electrode tabs 12 protrude during welding. Therefore, the production speed in the manufacturing processes of the battery module 1 may be improved to minimize a welding error.

Figure 9A:
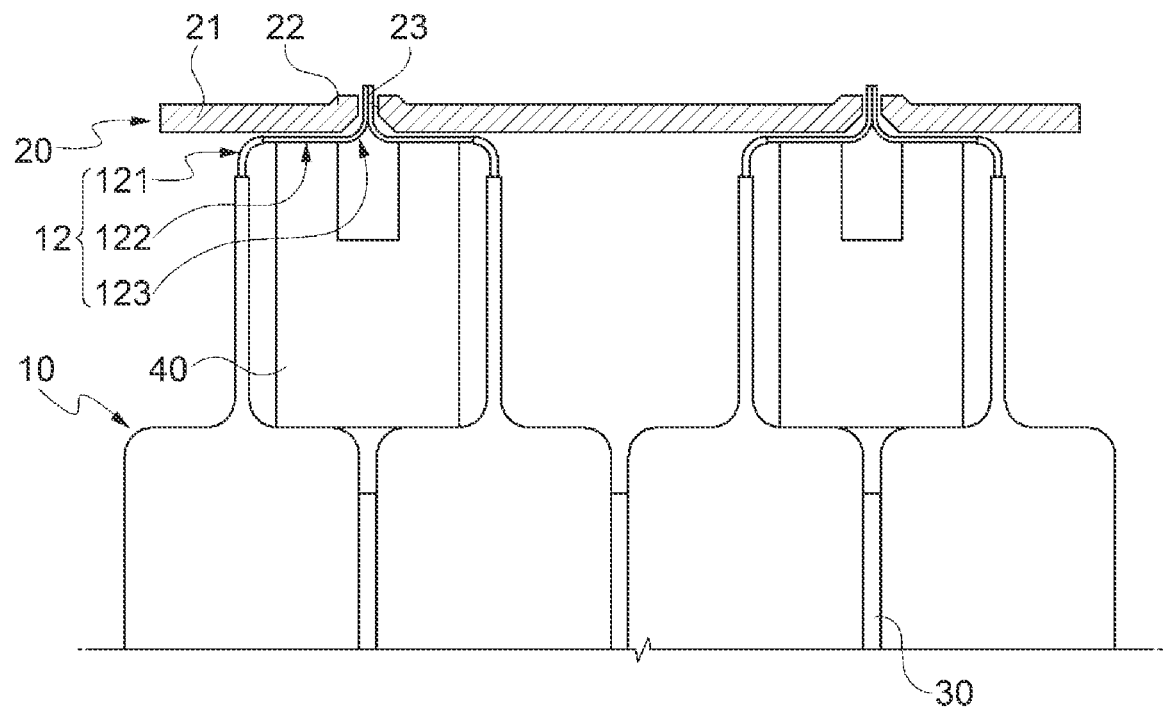
FIG. 9A is a cross-sectional view illustrating a state in which a jig is inserted between the bus bar and cell bodies according to another embodiment of the present invention.
Figure 9B:
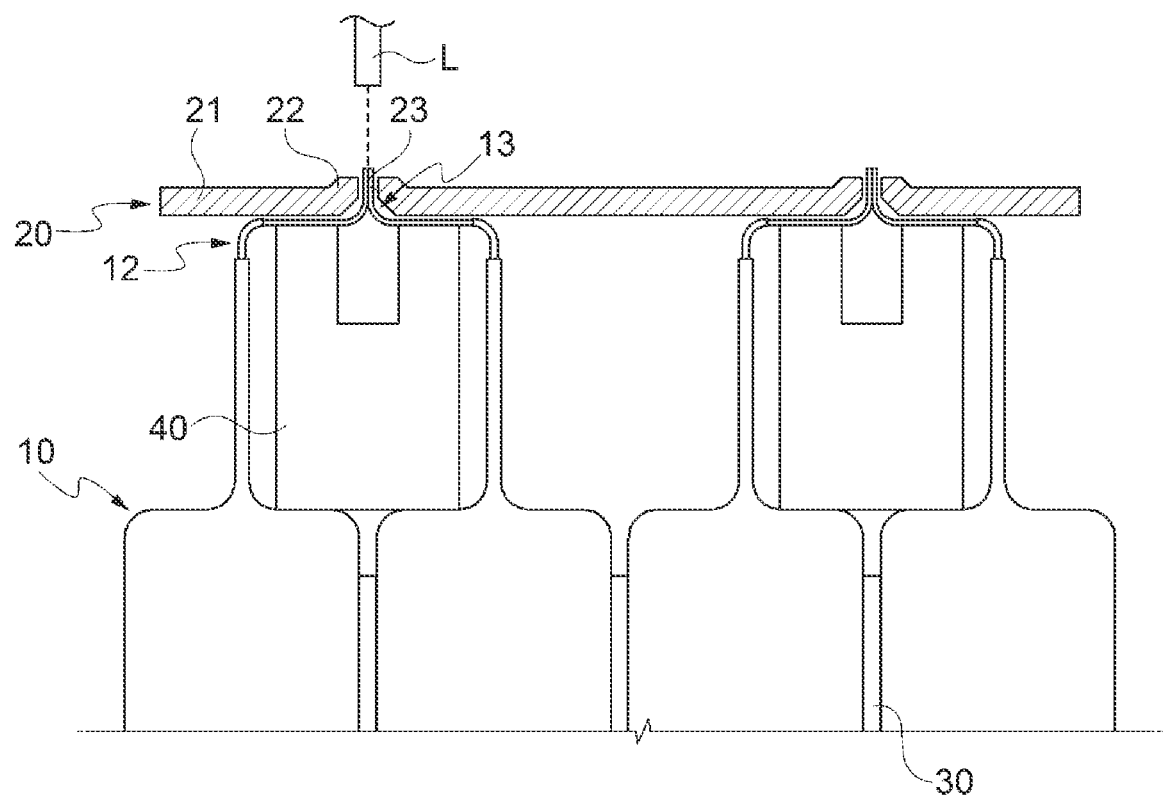
FIG. 9B is a cross-sectional view illustrating a state in which an electrode tab group inserted into the opening of the bus bar is irradiated with a laser beam.

FIG. 9A is a cross-sectional view illustrating a state in which the jig 40 is inserted between the bus bar 20 and cell bodies 11 according to another embodiment of the present invention, and FIG. 9B is a cross-sectional view illustrating a state in which the electrode tab group 13 inserted into the opening 23 of the bus bar 20 is irradiated with the laser beam L.

Referring to FIGS. 9A and 9B, after the bus bar 20 is placed on the plurality of electrode tabs 12, the jig 40 may be inserted between the bus bar 20 and the plurality of battery cells 10. Meanwhile, as described above, since the first bent part 121 and the second bent part 123 of the electrode tab 12 are formed at an angle of 80 to 90 degrees, the jig 40 may be easily inserted between the seat portion 122 of the electrode tab 12 and the cell bodies 11.

Thereby, it is possible to secure the stability between the welding processes during the bonding process such as laser welding. Specifically, the jig 40 may be inserted into the space between the seat portion 122 of the plurality of adjacent electrode tabs 12 and the cell bodies 11, and the jig may be positioned below the electrode tab group 13 in a direction in which the laser beam L is irradiated during laser welding, which will be described below, such that it is possible to prevent risks such as explosion, fire, and the like, which may be caused by directly irradiating the cell bodies 11 with the laser beam L due to excessive irradiation of the laser beam L.

Meanwhile, after the jig 40 is inserted between the seat portion 122 of the plurality of adjacent electrode tabs 12 and the cell bodies 11, at least a part of the electrode tab group 13 protruding outside the bus bar 20 and the bus bar 20 are bonded to be electrically connected with each other. Specifically, the bus bar 20 and the plurality of adjacent electrode tabs 12 may be connected with each other by laser welding. At this time, the laser beam L may be irradiated in a direction perpendicular to the plate 21 of the bus bar 20.

Thereby, the worker may simply irradiate the laser beam L toward at least a part of the electrode tab group 13 protruding outside the bus bar 20 on the upper side of the bus bar 20, and there is no particular limit in the process such as a need to irradiate the laser beam L obliquely to the direction in which the electrode tabs 12 protrude. Therefore, the working speed and accuracy between the welding processes may be greatly improved.

Figure 10A:
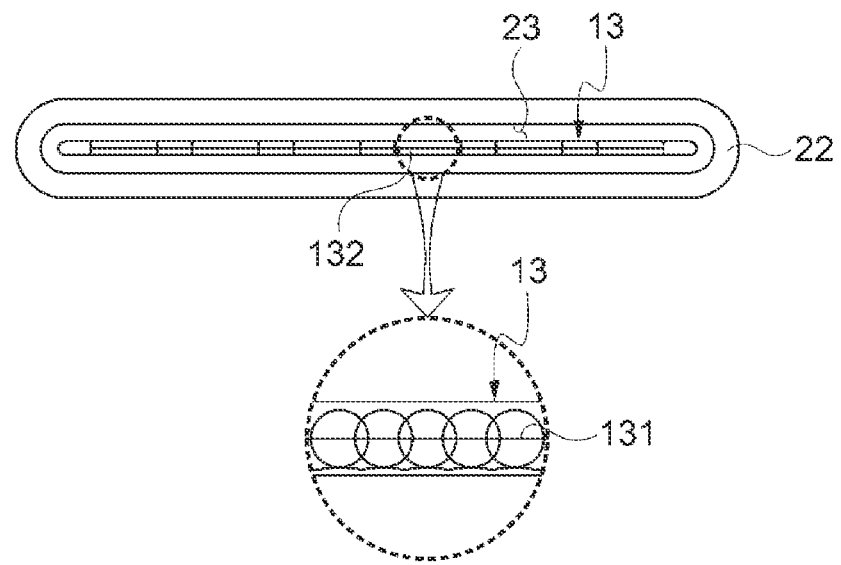
FIGS. 10A and 10B are cross-sectional views and partial enlarged views illustrating a state in which the electrode tab group is subjected to laser welding according to another embodiment of the present invention.
Figure 10B:
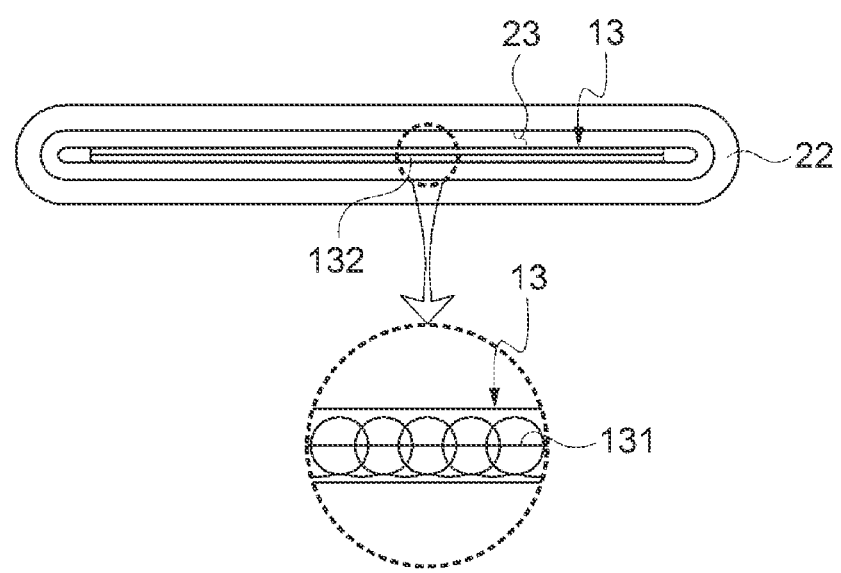

Meanwhile, as described above, three or more adjacent electrode tabs 12 may be inserted into and fixed to one opening 23 with being in contact with each other, and may be electrically connected to the bus bar 20 through welding or the like, which are the same as the above-described configuration, and therefore will not be described in detail. FIGS. 10A and 10B are cross-sectional views and partial enlarged views illustrating a state in which the electrode tab group 13 is subjected to laser welding according to another embodiment of the present invention.

Referring to FIGS. 10A and 10B, the above-described laser welding may be performed with a predetermined interval on end faces of the electrode tabs included in the electrode tab group 13. Herein, the laser beam L is repeatedly irradiated in a circular pattern without being irradiated in a straight line, and centers of circles formed by the laser beam may be arranged along a longitudinal axis 131 of the end faces of the electrode tabs included in the electrode tab group 13.

As described above, a welding part 132 of the electrode tab group 13 may be uniformly melted through wobble type welding of a pattern in which *circulars* are repeatedly formed and overlapped with each other, and in particular, which may be effectively applied to precision welding. Thereby, it is possible to improve the stability in the manufacturing process of the battery module 1 during the welding process for the electrode tab 12 included in the battery cell 10 which is vulnerable to high temperature.

Meanwhile, while the method of performing the laser welding with a predetermined interval has been described, but it is not limited thereto, and as illustrated in FIG. 10B, the end faces of the electrode tabs included in the electrode tab group 13 may be continuously irradiated with the laser beam L, and thereby the welding part 132 may be formed in a straight continuous shape.

Further, as described above, as the laser beam L is irradiated in a circular pattern, at least a part of the electrode tab group 13 protruding outside the bus bar 20 is melted, such that the above-described beads 14 may be formed, as well as the bus bar 20 and the plurality of adjacent electrode tabs 12 are bonded to each other, such that the plurality of battery cells 10 may be electrically connected with each other.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the above-described embodiments, but be defined by the appended claims as well as equivalents thereof.

DESCRIPTION OF REFERENCE NUMERALS

1: Battery module
10: Battery cell
100a, 100b, 100c, 100d, 100e, 100f: Parallel assembly
11: Cell body
12: Electrode tab
121: First bent part
122: Seat portion
123: Second bent part
12a: Terrace portion
12b: Insulation portion
12c: Electrode tab portion
13: Electrode tab group
131: Longitudinal axis of end face of electrode tab
132: Welding part
14: Bead
20: Bus bar
21: Plate
22: Protrusion
23: Opening
200: Bus bar cover
30: Elastic member
40: Jig
L: Laser
θ1: Angle of first bent part
θ2: Angle of second bent part

What is claimed is:
1. A battery module comprising:
a plurality of battery cells, each of the plurality of battery cells including a cell body and electrode tabs extending from the cell body; and
a bus bar coupled to the electrode tabs of the plurality of battery cells,
wherein the bus bar includes a plate and at least two openings formed in the plate, wherein each of the electrode tabs includes:
a terrace portion extending towards the bus bar from the cell body;
a first bent part extending from the terrace portion, the first bent part is bent towards a corresponding opening of the at least two openings, the first bent part covered with insulation; and
a seat portion extending alongside the bus bar from the first bent part,
wherein the electrode tabs of at least two battery cells of the plurality of battery cells are inserted into one of the at least two openings and connected to each other; and
wherein the seat portion is in contact with the inner surface of the plate.

2. The battery module according to claim 1, wherein the seat portion is in contact with the plate.

3. The battery module according to claim 1, wherein each of the electrode tabs is inserted into the corresponding opening, and wherein an end portion of each of the electrode tabs is positioned in the corresponding opening.

4. The battery module according to claim 3, wherein wobble type beads are formed at the end portions of the electrode tabs of the at least two battery cells.

5. The battery module according to claim 1, wherein each of the at least two openings is formed in a slit shape.

6. The battery module according to claim 1, wherein at least four battery cells of the plurality of battery cells are connected to the bus bar.

7. The battery module according to claim 6, wherein the at least two opening includes a first opening and a second opening, wherein the plurality of battery cells include a first two battery cells connected to the first opening and a second two battery cells connected to the second opening.

8. The battery module according to claim 1, wherein each of the electrode tabs further includes a second bent part bent and extending towards the corresponding opening from the seat portion.

9. The battery module according to claim 1, wherein the plate is electrically connected to the seat portion.

10. The battery module according to claim 9, wherein the plate is electrically isolated from the terrace portion.

11. The battery module according to claim 1, wherein the first bent part has an arch shape.

12. The battery module according to claim 1, wherein each of the at least two openings includes an inclined surface, the inclined surface being inclined with respect to the cell body.

13. The battery module according to claim 12, wherein the inclined surface faces the cell body obliquely.

14. The battery module according to claim 1, wherein the bus bar includes at least two protrusions formed at the at least two openings respectively.

15. The battery module according to claim 14, wherein the plate has an inner surface and an outer surface opposite the inner surface, wherein the inner surface faces the cell body, and wherein the at least two protrusions protrude from the outer surface.

16. The battery module according to claim 15, wherein wobble type beads are formed at the at least two protrusions.

17. A battery module comprising:
a plurality of battery cells, each of the plurality of battery cells including a cell body and electrode tabs extending from the cell body; and
a bus bar coupled to the electrode tabs of the plurality of battery cells,
wherein the bus bar includes a plate and an opening formed in the plate,
wherein the plate has an inner surface facing the cell body,
wherein each of the electrode tabs includes:
a terrace portion extending towards the inner surface of the plate from the cell body;
a first bent part extending from the terrace portion towards the inner surface, the first bent part curved with respect to the terrace portion; and
a seat portion extending alongside the inner surface from the first bent part,
wherein one of the electrode tabs is inserted into the opening; and
wherein the seat portion is in contact with the inner surface of the plate.

18. The battery module according to claim 17, wherein each of the electrode tabs further includes a second bent part extending towards the opening from the seat portion.

19. The battery module according to claim 17, wherein the opening includes an inclined surface, wherein the inclined surface is inclined with respect to the cell body.

* * * * *